US008949215B2

(12) United States Patent
Wang et al.

(10) Patent No.: US 8,949,215 B2
(45) Date of Patent: Feb. 3, 2015

(54) GUI BASED WEB SEARCH

(75) Inventors: Min Wang, Beijing (CN); Zheng Chen, Beijing (CN); Jian-Tao Sun, Beijing (CN); Shen Huang, Beijing (CN); Jian Wang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 828 days.

(21) Appl. No.: 12/038,588

(22) Filed: Feb. 27, 2008

(65) Prior Publication Data

US 2008/0208819 A1 Aug. 28, 2008

Related U.S. Application Data

(60) Provisional application No. 60/892,175, filed on Feb. 28, 2007.

(51) Int. Cl.
*G06F 17/30* (2006.01)

(52) U.S. Cl.
CPC .... *G06F 17/30696* (2013.01); *G06F 17/30643* (2013.01); *G06F 17/30864* (2013.01)
USPC ............................ 707/708; 715/854; 715/848

(58) Field of Classification Search
CPC ................ Y10S 707/99933; Y10S 707/99932; Y10S 707/99945; Y10S 707/99943; G06F 17/30241; G06F 17/30864; G06F 17/30873; G06F 17/3087; G06F 17/30994; G06F 17/30554; G06F 17/30643; G06F 17/30696
USPC .......................................... 715/709–712, 825
See application file for complete search history.

(56) References Cited

U.S. PATENT DOCUMENTS

| | | | | |
|---|---|---|---|---|
| 5,835,087 | A * | 11/1998 | Herz et al. | 715/810 |
| 6,154,213 | A * | 11/2000 | Rennison et al. | 715/854 |
| 6,448,987 | B1 * | 9/2002 | Easty et al. | 715/834 |
| 6,567,812 | B1 * | 5/2003 | Garrecht et al. | 707/708 |
| 6,801,229 | B1 * | 10/2004 | Tinkler | 715/853 |
| 7,134,083 | B1 * | 11/2006 | Guerrero | 715/760 |
| 7,149,983 | B1 * | 12/2006 | Robertson et al. | 715/810 |
| 7,330,845 | B2 * | 2/2008 | Lee et al. | 1/1 |
| 7,366,990 | B2 * | 4/2008 | Pitroda | 715/745 |
| 7,574,659 | B2 * | 8/2009 | Szabo | 715/738 |
| 7,698,387 | B2 * | 4/2010 | Nagata et al. | 709/219 |
| 8,700,604 | B2 * | 4/2014 | Roseman et al. | 707/716 |
| 2002/0103789 | A1 * | 8/2002 | Turnbull et al. | 707/3 |
| 2005/0022114 | A1 * | 1/2005 | Shanahan et al. | 715/513 |

(Continued)

OTHER PUBLICATIONS

Jason A. Dykes "Exploring Spatial Data Representation With Dynamic Graphics", Compurers & Geosciences vol. 23, No. 4, pp. 345-370. 1997.*

*Primary Examiner* — Polina Peach
(74) *Attorney, Agent, or Firm* — Dan Choi; Judy Yee; Micky Minhas

(57) ABSTRACT

An exemplary computer implemented graphics-based Web search system includes a search input control and a results presentation control where the search input control is configured to receive user input to establish a relationship between a query and one or more information tags associated with search results provided by a search engine in response to the query and wherein the results presentation control is configured to re-order the search results in response to the relationship. Such a system allows a user to define and refine search intent and enhance the user's search experience. Various other exemplary systems, methods, devices, etc. are also disclosed.

16 Claims, 15 Drawing Sheets

100
msn.com
http://www.msn.com
msn.com
M1 M2 MN
110
DESIGN SOURCES
DESIGN MULTIMEDIA
PRODUCT DESIGN
DESIGNER
LOGO DESIGNS
GRAPHIC DESIGN FIRM
GRAPHIC DESIGN SERVICE
120
WEB RESULTS 601,322
LOGO DESIGN GURU
THE COMPANY FOR YOUR DESIGN NEEDS
WWW.GURUIDESIGNTEAMLTD.COM
CHRISTIAN GRAPHIC DESIGN SERVICES
CHRISTIAN GRAPHIC DESIGNS, WEBSITES, ETC.
WWW.CHRISTIANGRAPHICSSERVICES.COM
LOGO LOGO DESIGN GRAPHICS
ABC GRAPHIC DESIGNS
WWW.ABCLOGOSDESIGNGRAPHIC.COM

(56) References Cited

U.S. PATENT DOCUMENTS

2005/0028077 A1* 2/2005 Wen et al. .................. 715/500.1
2006/0117067 A1* 6/2006 Wright et al. .............. 707/104.1
2007/0070066 A1* 3/2007 Bakhash ....................... 345/419
2007/0136256 A1* 6/2007 Kapur et al. ...................... 707/3
2008/0010605 A1* 1/2008 Frank ............................ 715/765
2008/0098311 A1* 4/2008 Delarue et al. ................ 715/739
2008/0270384 A1* 10/2008 Tak .................................. 707/5

* cited by examiner

EXEMPLARY CARTESIAN COORDINATE MAPPING
1400

GUI BASED WEB SEARCH

RELATED APPLICATION

This non-provisional patent application claims the benefit of and priority to U.S. Provisional Patent Application 60/892,175, entitled "GUI based Web Search", filed Feb. 28, 2007, which is incorporated by reference herein, in its entirety.

BACKGROUND

Search engine technology has become quite popular to help users seek information available on the Web. Most users have been trained to become accustomed to the traditional search interface where a user submits a query to an input textbox and a search engine returns a group of Web pages organized in a list view. Given the list view, the user typically needs to navigate through the returned list of Web pages to find desired information.

The aforementioned conventional search experience has two major drawbacks. First, it is not easy for Web users to specify their search intentions by term combination. Sometimes a user can not generate a query correctly even though the user is clear about what to search. Also, even if a user is an expert in formulating search queries; the user may refuse to submit complex queries because most search engine users are lazy. The length of most search queries falls in the range of 1.66 words. Moreover, the short queries often lead to a huge amount of search results since the system is difficult to grasp the user's true intention. Hence, the user has to refine the queries by adding, deleting or modifying query terms many times until they get the information they need. The second drawback of conventional search engine design lies in the presentation of search results. The typical solution is to organize search results into a long list, where the list is divided into many result pages. Although various search algorithms have been applied to rank Web pages by their relevance scores, it is quite often that the desired page is not ranked top in the result list. Thus it can be quite time consuming for a user to navigate through the search results one by one, and page by page. Indeed, a study shows that 62% of search engine users only click on the results contained in the first page. Thus, a better user interface is desired to search and/or to present search results.

SUMMARY

An exemplary computer implemented graphics-based Web search system includes a search input control and a results presentation control where the search input control is configured to receive user input to establish a relationship between a query and one or more information tags associated with search results provided by a search engine in response to the query and wherein the results presentation control is configured to re-order the search results in response to the relationship. Such a system allows a user to define and refine search intent and enhance the user's search experience. Various other exemplary systems, methods, devices, etc. are also disclosed.

DESCRIPTION OF THE DRAWINGS

Non-limiting and non-exhaustive examples are described with reference to the following figures.

DETAILED DESCRIPTION

As discussed herein, a GUI based Web Search solution, denoted as GWS, helps Web users easily express search intentions and identify interested Web pages quickly. While the GWS includes features specific to Web searches, the technology can be applied to other types of searches. For example, various features may be applied to data base searches or other information searches.

As described in more detail below, two exemplary GWS controls overcome some of the challenges faced by traditional Web search technologies. One control is referred to as "Smart Input" control (SI). SI is used by search engine users to specify desired information. In various examples, SI control is shown on the top of a user interface. Another control is referred to as "Result Presentation" control (RP). In various examples, RP control is used to present search results and can be shown at the bottom of a GWS interface.

Some approaches to improve conventional searches include query suggestion and result clustering. In query suggestion, a search engine automatically suggests some candidate queries for end users. However, it is often hard for a user to predict whether a new selected query will return good results or not. Also, while it is common that user intention is related to several suggested queries, most search engines only allow users to select one of the suggested queries. As a result, for such limiting reasons, query suggestion has not been proven very successful.

Another popular method is search result clustering, which involves clustering search results into semantically related groups where each group corresponds with a topic. When using this technique, Web users need to first select the cluster of interest and then navigate through the pages of that cluster to find the desired information. If the pages are not returned by original query, it is typically impossible for a user to find it in any clusters.

Figure 1:
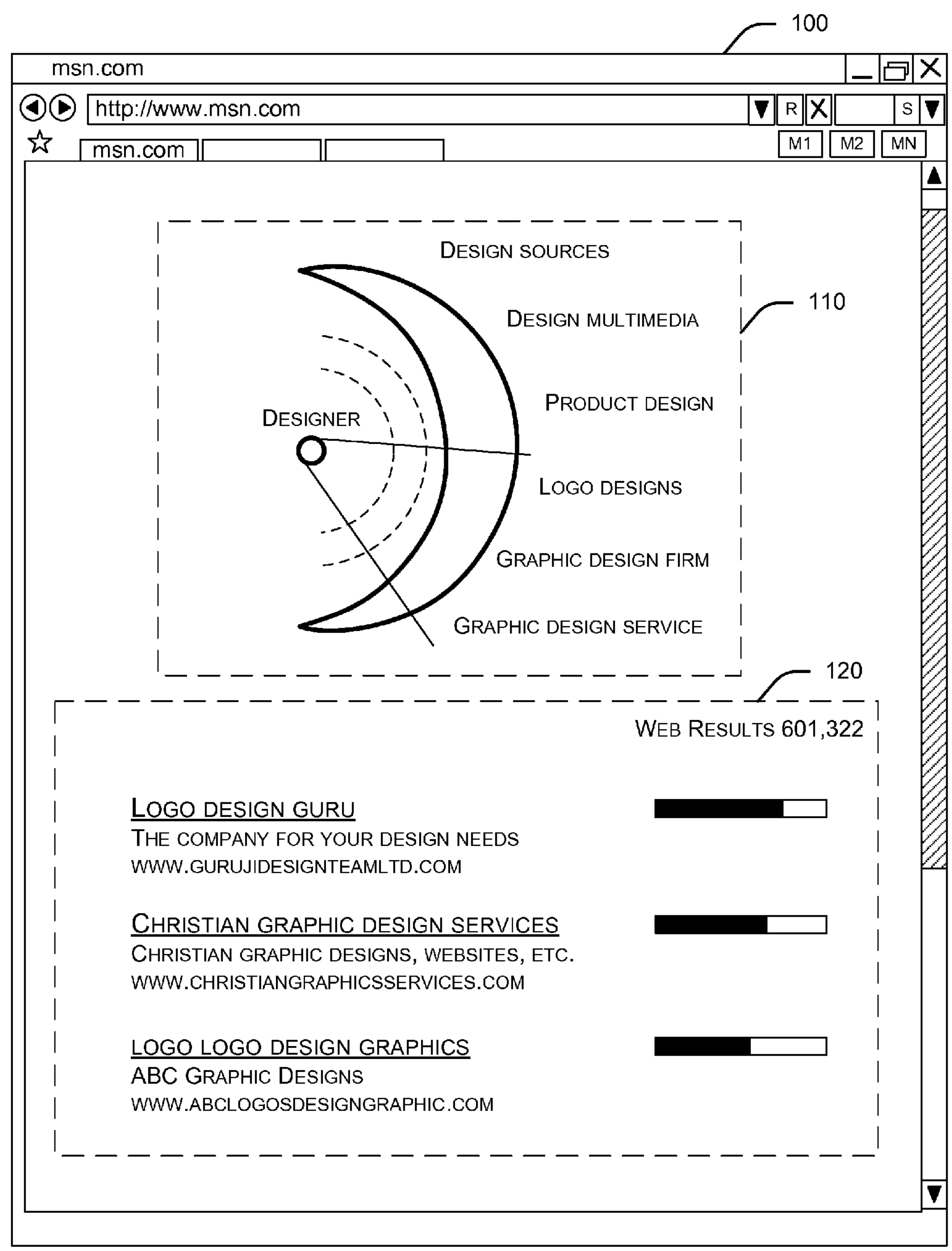
FIG. 1 is a diagram of an exemplary GUI arrangement for a GUI based Web Search application (GWS)

FIG. 1 shows an exemplary GUI arrangement to demonstrate how SI and RP, as well as other exemplary techniques, can enhance searching and the searching experience. In the example of FIG. 1, the Web browser interface 100 includes an address bar (e.g., http://www.msn.com), various tools/menus (e.g., MN1, MN2, . . . MNN) and a series of tabs. For the selected tab, the interface includes an exemplary GUI with a user input portion 110 and a results portion 120. The user driven portion includes the aforementioned SI control while the results portion includes the aforementioned RP control. These two controls can provide a user with an enhanced Web browsing experience.

An exemplary GWS method for a Web search can involve an iterative process of manipulating the SI control in the user input portion 110 and observing the output of the RP control in the results portion 120. For example, after the SI control receives an initial query submitted by a user, the GWS can redirect the query to a commercial search engine. Information tags can be generated from the search results and organized along the SI control graphic, which is shown in a half-moon (or crescent) configuration in the user input portion 110. Top search results can be displayed using the RP control 120 in a results portion 120 of the GUI.

After browsing the tags to have some idea about the search scopes, a user can drag the initial query term or graphic (referred to herein as a query graphic, which may be simply a text item, a simple object or a complex object) along a plurality of information tags displayed by the SI control in the user input portion 110 to thereby refine the user's search intention. During the dragging of the query graphic, the RP control dynamically updates the results displayed in the results portion 120 to reflect the changes in the user's search intention. The results displayed in the results portion 120 can provide feedback to the user whereby the user may further refine her intention or search. Further, based on the results or results preview output by the RP control and displayed in the results portion 120, a user will know whether she is operating the SI control correctly. If the RP results are closer to the desired information, the user can drop the initial query and the GWS can issue a new query to the search engine, which may be a conventional or other commercially available search engine.

As described herein, an exemplary GWS can refine and issue a user's intention. In particular, a graphic can be used to arrange information that allows a user to input information that an exemplary GWS can use to issue and refine user's intention, intuitively and easily. Hence, an exemplary GWS can provide for issuing and refining a user's intention.

Figure 2:
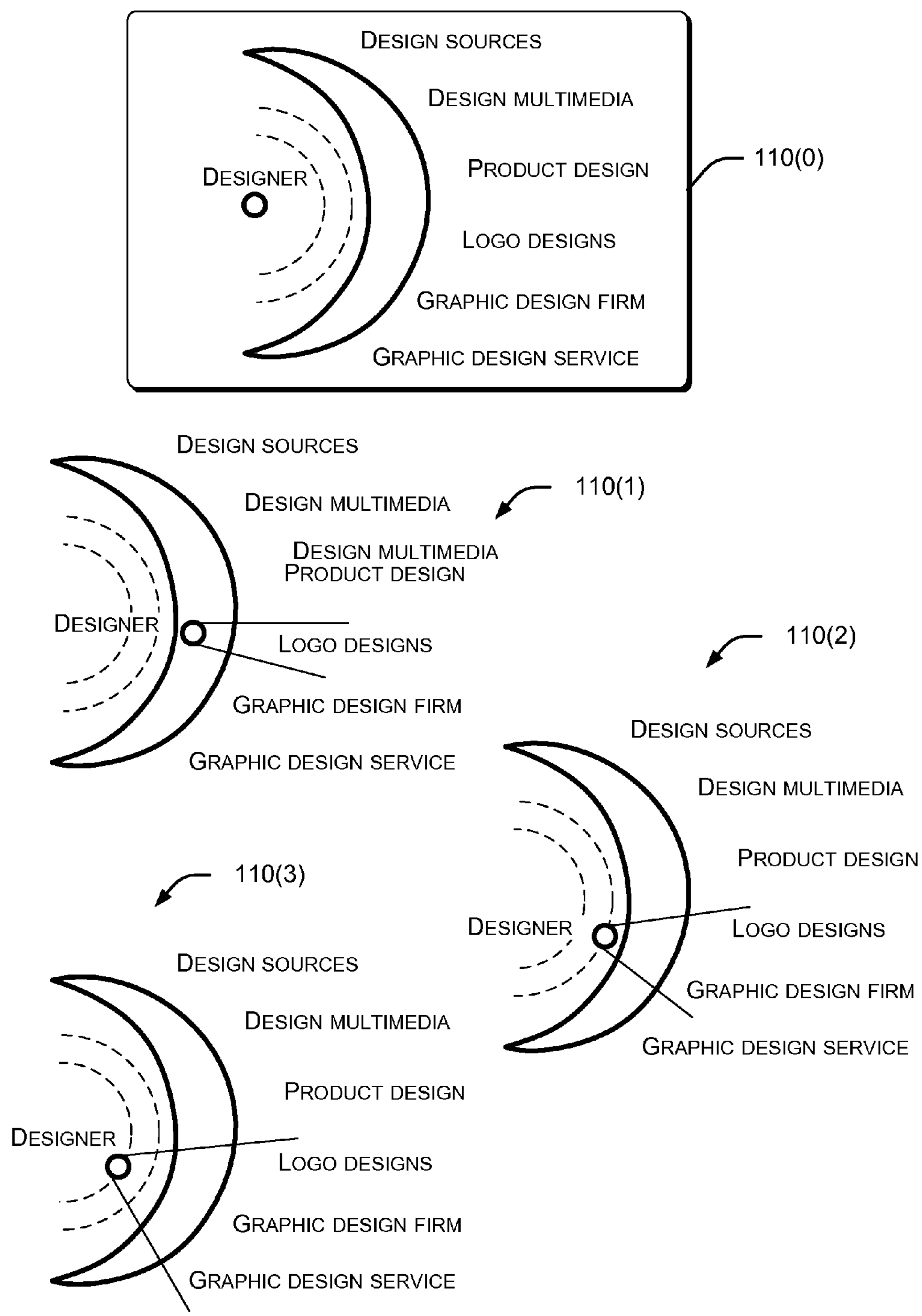
FIG. 2 is a diagram of an exemplary method for manipulating a GWS application to refine search intent.

The example shown in FIG. 2 helps to describe how an exemplary GWS can operate. For example, consider a user named Peter who wants to find some designers to help develop a project. In particular, Peter would like to find a vender company capable of providing design services to design a graphic design, a logo design, etc.

Given Peter's search as an example, a description follows to illustrate how a user can interact with the two GWS controls to find desired information. First, Peter enters a keyword "Designer", as shown in user input portion 110(0). In turn, the GWS system automatically generates a set of key phrases: "product design", "logo design", etc. and organizes the key phrases into a continuous list. The GWS system then renders the list items around a half-moon GUI control. The generated phrases, referred to as information tags, can give users an overview of the search scope and guide them to refine their search intentions. When Peter finds some information tags (e.g., "logo design", "graphic design firm", "graphic design service") that he interest him, he can then drag the initial query "Designer" (i.e., the query graphic) in a manner that establishes a relationship with one or more of these tags (see input portions 110(1), 110(2) and 110(3)). As Peter drags the query graphic around the information tags, the SI control causes one or more of the information tags to be highlighted and causes the RP control to re-rank the results and display them in the display portion (see, e.g., the display portion 120 of FIG. 1).

Through use of the SI and RP controls, if Peter feels that the results are a little closer to his intention, he can drop the query at that point in the GUI of the user input portion 110. Once dropped, the GWS system can generate a new combination query based on his intention and the information tags. The new query can be input to the search engine (or engines) and search results displayed using the RP control. Peter can continue his drag and drop actions until he finds the desired information. As explained further below, an exemplary GWS system can also provide a GUI history to facilitate user navigation to any intermediate step to refine the search (e.g., within user or system defined limitations).

FIGS. 1 and 2 show some aspects of an exemplary GWS system. In particular, an exemplary GWS system may include information tag features, intention generation features, dynamic results preview features, and history management features.

With respect to information tags, these can be generally considered a set of salient phrases that can be extracted from pages returned by a search engine in response to an initial query. The information tags generally summarize the contents contained in the search results. Information tags can be organized graphically, for example, along a half-moon graphic (e.g., one by one in continuous form).

Concepts corresponding to the information tags are intended to change along the half-moon, usually in a gradual and logical manner. For example, the closer two tags are, the more similar they are in concept, and vice versa. As already mentioned, a user can drag an initial query (e.g., a query graphic) along a series of information tags to refine the user's search intention.

Where display space is limited with respect to the number of information tags (e.g., if the tag number "N" is larger than 6), then the first X number of tags may be displayed while the remaining tags (N−X) may be displayed in the upper tail of the half-moon and represented by a small icon or other graphic (e.g., a few stars). A user may investigate these tags by positioning a cursor on the tail of the half-moon where, in turn, an information tag list appears (e.g., optionally a scrollable list) to show the hidden tags. For example, if a mouse cursor is hovered on the upper tail, the tags contained in this tail will be moved out and those already on the half-moon will be moved into the lower tail one by one. This configuration enables a user to interact with all possible information tags to refine their search intention.

With respect to intention generation, when a user drags the query graphic within a semi-circular space defined by the inner semi-circle of the half-moon, a predetermined number of information tags (e.g., the three most adjacent information tags) can be selected and used to determine search intention. As shown in FIG. 2, a series of concentric semi-circles exist whereby each semi-circle can select a certain number of information tags.

By positioning a query graphic with respect to the displayed tags, a user can select, for example, three tags to thereby input intention information (see 110(3) of FIG. 2). Similarly, when the query is dragged into the next semi-circle, two adjacent tags can be selected for specifying user intention while seeking desired information, which means that the user wants to find logo designers and graphic design firm (see 110(2) of FIG. 2). When it is dragged to the inner semi-circle of the half-moon or within the half-moon, a single adjacent tag may be selected. For example, in the user input portion 110(1) of FIG. 2, the user inputs the intention of finding a logo designer(s).

As described herein, an exemplary method includes receiving search results responsive to a search query; based at least in part on the search results, generating information tags for graphical display adjacent to a control graphic configured to receive user input to express a user's search intent with respect to one or more of the information tags; receiving user input via the control graphic; and, based at least in part on the received user input, ranking the search results.

As described herein, an exemplary system includes a search input control that includes a mechanism for establishing a relationship between a query and a number of information tags. For example, such a mechanism may rely on a distance between a query graphic and at least one of the information tags. As shown in various examples for a distance-based mechanism, a greater distance establishes a relationship between the query and a greater number of the information tags and a lesser distance establishes a relationship between the query and a lesser number of the information tags. In other words, a distance can be used to express a user's search intent as being related to a particular number of graphically displayed information tags.

While various examples are shown as black and white line drawings, an exemplary GWS may include mechanisms that adjust or use color, shading, font size, etc. For example, an exemplary method can include adjusting one or more display characteristics of one or more information tags in response to the receiving user input (e.g., movement of a user cursor associated with an SI control). Such a mechanism may adjust display color of one or more of the information tags. In such a manner, color or other characteristics may indicate to a user how the information tags will be weighted, for example, in ranking the search results. Hence, red may indicate heavy weighting and blue may indicate light or no weighting.

Figure 3:
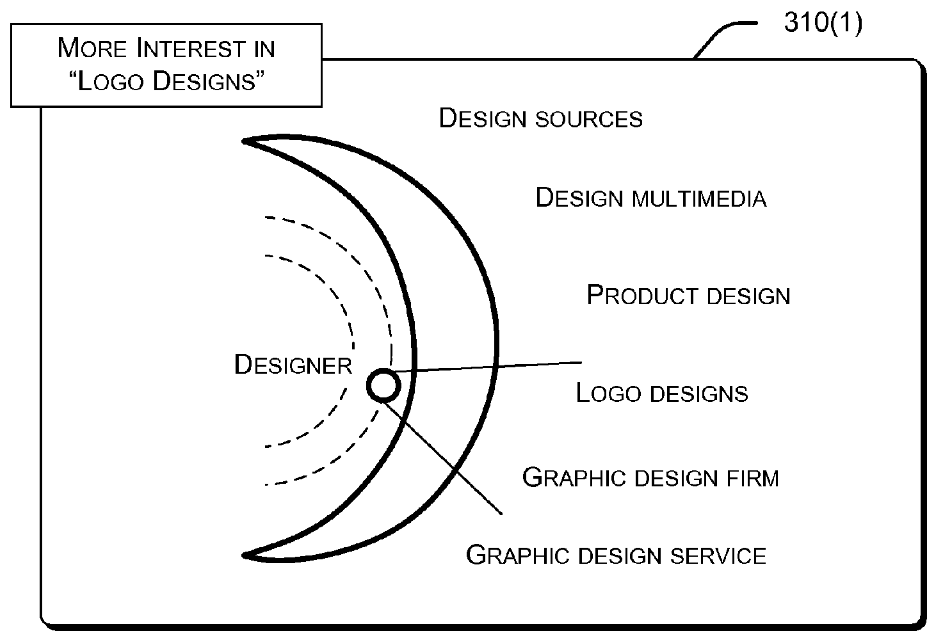
FIG. 3 is a diagram of an exemplary GUI that allows a user to weight or express interest in search information related to a query.
Figure 3:
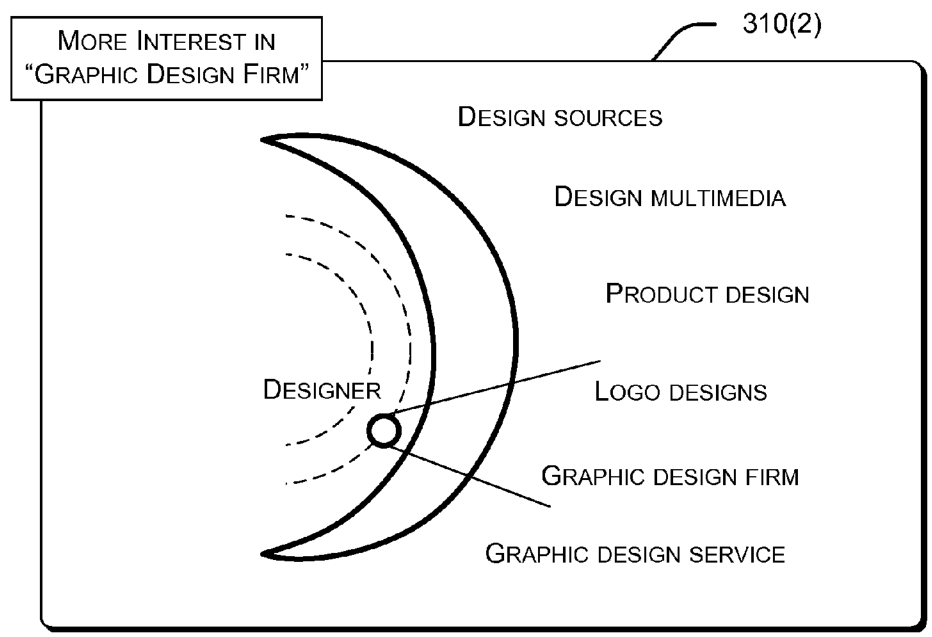

FIG. 3 shows an example where an exemplary SI control can allow a user to input information by dragging or positioning a query graphic along the half-moon graphic (or other suitable graphic). In this example, both the information tags and the query position information can be used for refining the search intention. As mentioned above, the query position can be used to decide which information tag or tags are used to specify the information needed. As described herein, an exemplary SI uses distance between a query graphic and one or more information tags to input a user's tendency towards one or more displayed information tags. As shown in FIG. 3, although both "logo design" and "graphic design firm" tags are selected, the weight of "logo design" tag in user input portion 310(1) is larger than "graphic design firm", which means the user cares more about "logo design" than "graphic design firm". Thus, Web users can easily generate complicated search query by operating such an SI control. In contrast, the user input portion 310(2) shows the weight being shifted toward the information tag "graphic design firm".

Figure 4:
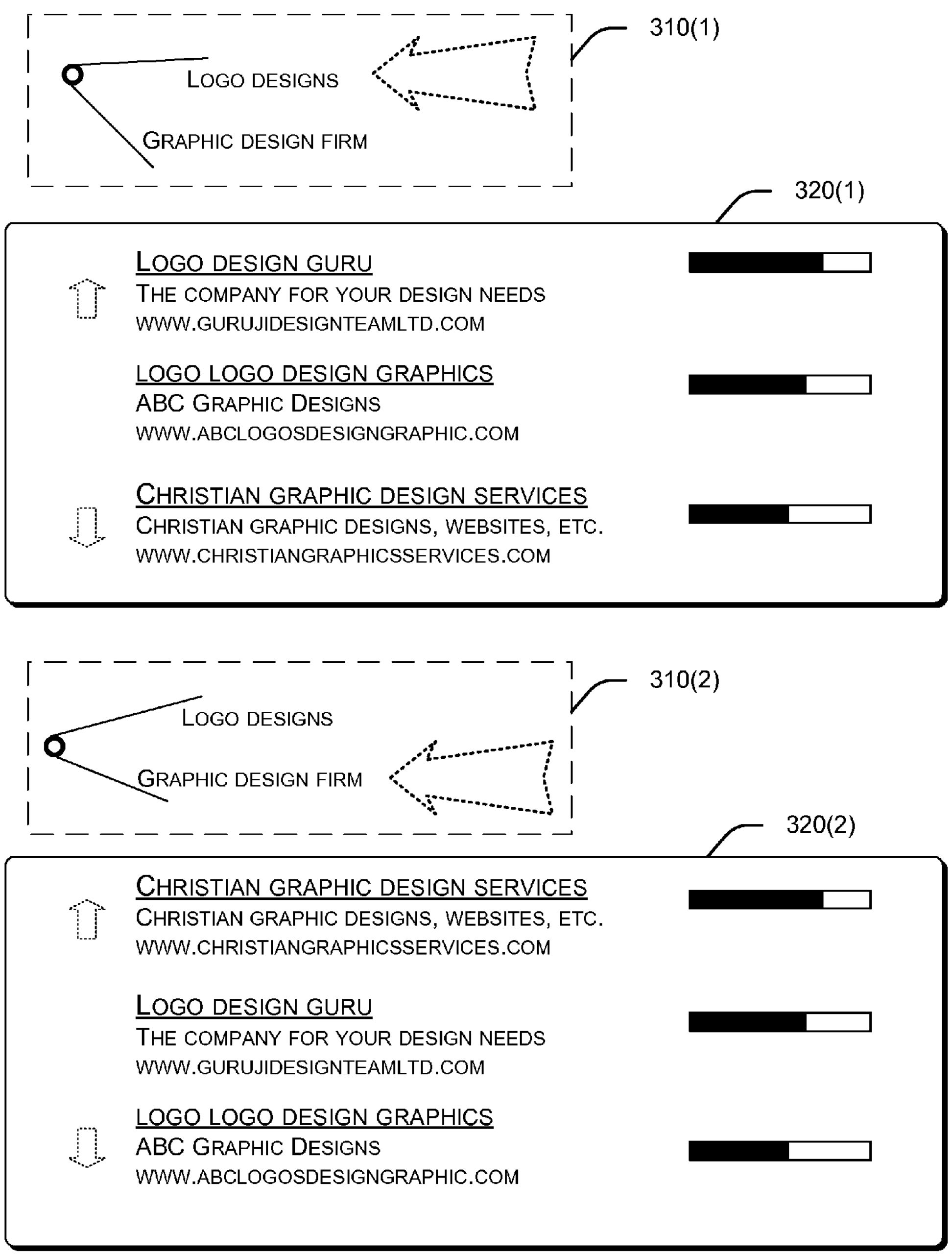
FIG. 4 is a diagram of an exemplary GUI that responds to user expression of search intent by adjusting rankings of search results.

FIG. 4 shows how manipulation of the user input graph 310 can cause the RP control to automatically update the search results in the results portion 320. In particular, as the query graphic is moved in the user input portion 310(1) towards the information tag "logo designs", the RP control receives this input and causes an update and re-display of the results in the results portion 320(1). For purposes of illustration of the relationship between input and output, arrows are presented adjacent to indicate a change in the order of a search result with respect to the intent of a user. Similarly, as the query graphic is moved in the user input portion 310(2) toward the information tag "graphic design firm", the RP control receives this input and causes an update and re-display of the results in the results portion 320(2). Further, a measure bar may indicate the relevance of the results list item (e.g., a Web page) with respect to the user input information (e.g., 100% for a full bar).

As already mentioned, a RP control can provide for dynamic result preview. For example, when a user drags-and-drops a query graphic along a SI control graphic to refine the search intentions, the corresponding search results can be dynamically updated accordingly for a user's preview. Thus, a user can have some ideas about whether he is closer to the desired information or is further away from it. This feature has advantages over query suggestion click-and-look methods. Also, the drag-and-drop and result preview features facilitates user review by allowing a user to quickly explore the possible search scopes. Thus, the SI and RP controls can help avoid the need to navigate through a long result list, as typically required by conventional search engines and most search result clustering systems.

With respect to history management, an exemplary GWS system allows storage of prior inputs and optionally associated results. Such a feature allows a user to easily go back to an intermediate step for the purpose of refining search intention. Further such a feature is useful in the case where a user loses his way during the search activities (e.g., interrupted by a phone call, lack of concentration, distracted by a tangential thought, etc.).

Figure 5:
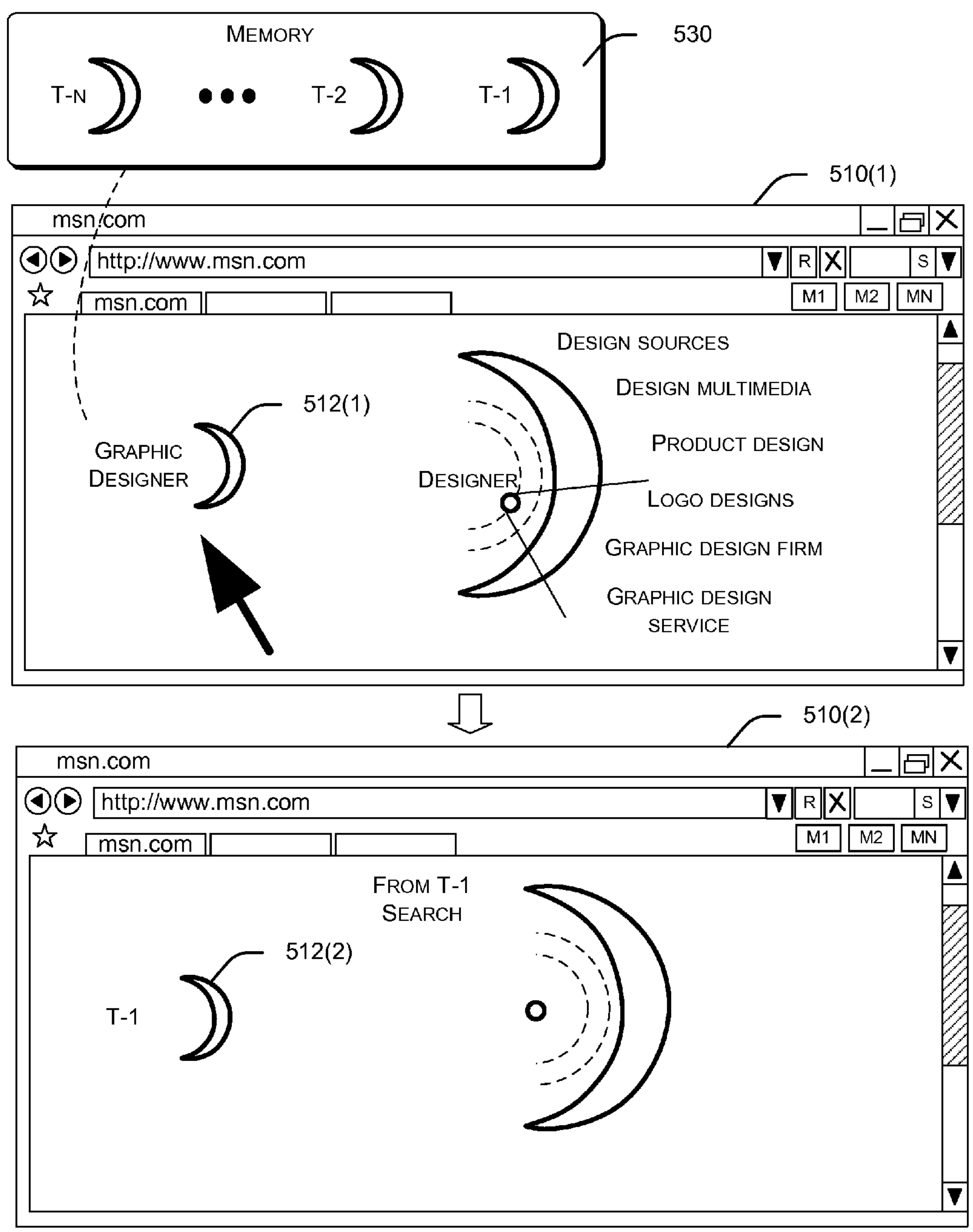
FIG. 5 is a diagram of an exemplary GUI that allows for loading historical information about a Web search or searches.

FIG. 5 shows a history graphic 512(1) as associated with a current search query in a user input portion 510(1). The history graphic 512(1) is associated with information stored in memory 530. Thus, if a user selects the history graphic 512 (1), the user may navigate through the stored history. For example, the user input portion 510(2) shows a search from a prior point in time (t−1) where a history graphic 512(2) relates to a yet prior search/intention history. In this example, the history graphic is a smaller half-moon (or crescent) with a search term (e.g., a query term) or other text or graphic, which may be optional (i.e., the history graphic may be a simple graphic with no other query term specific information).

Figure 6:
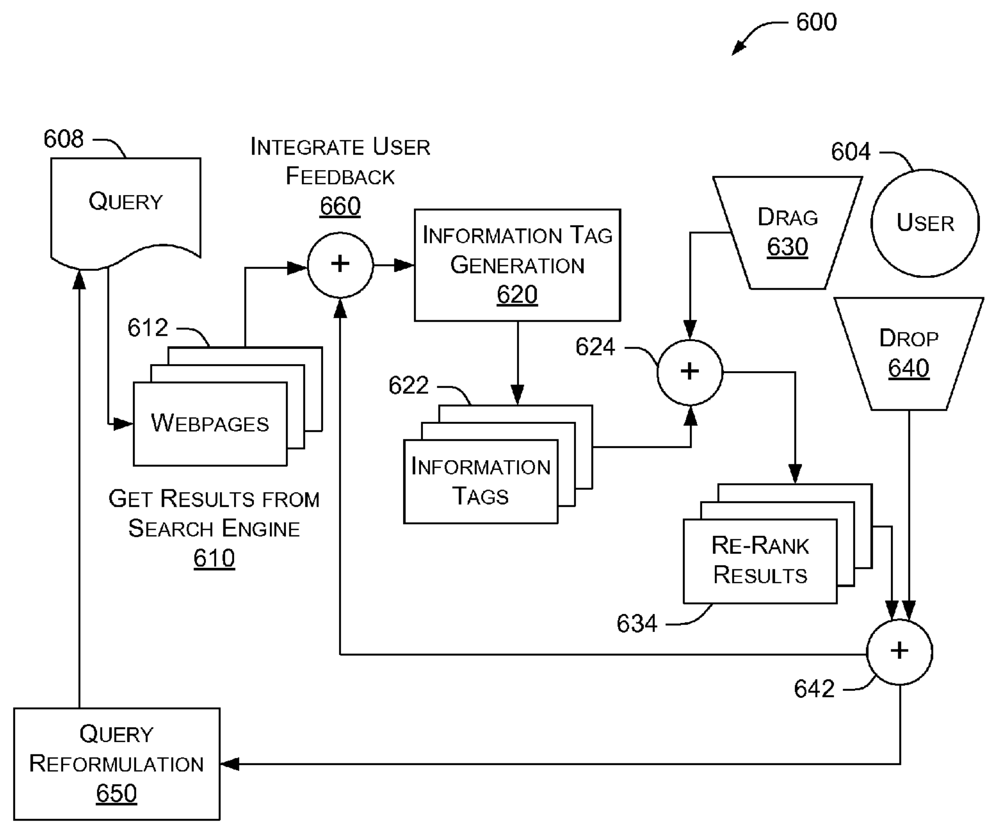
FIG. 6 is a diagram of an exemplary GWS system for reformulating a query and/or other action based at least in part on expression of a user's search intent.
Figure 7:
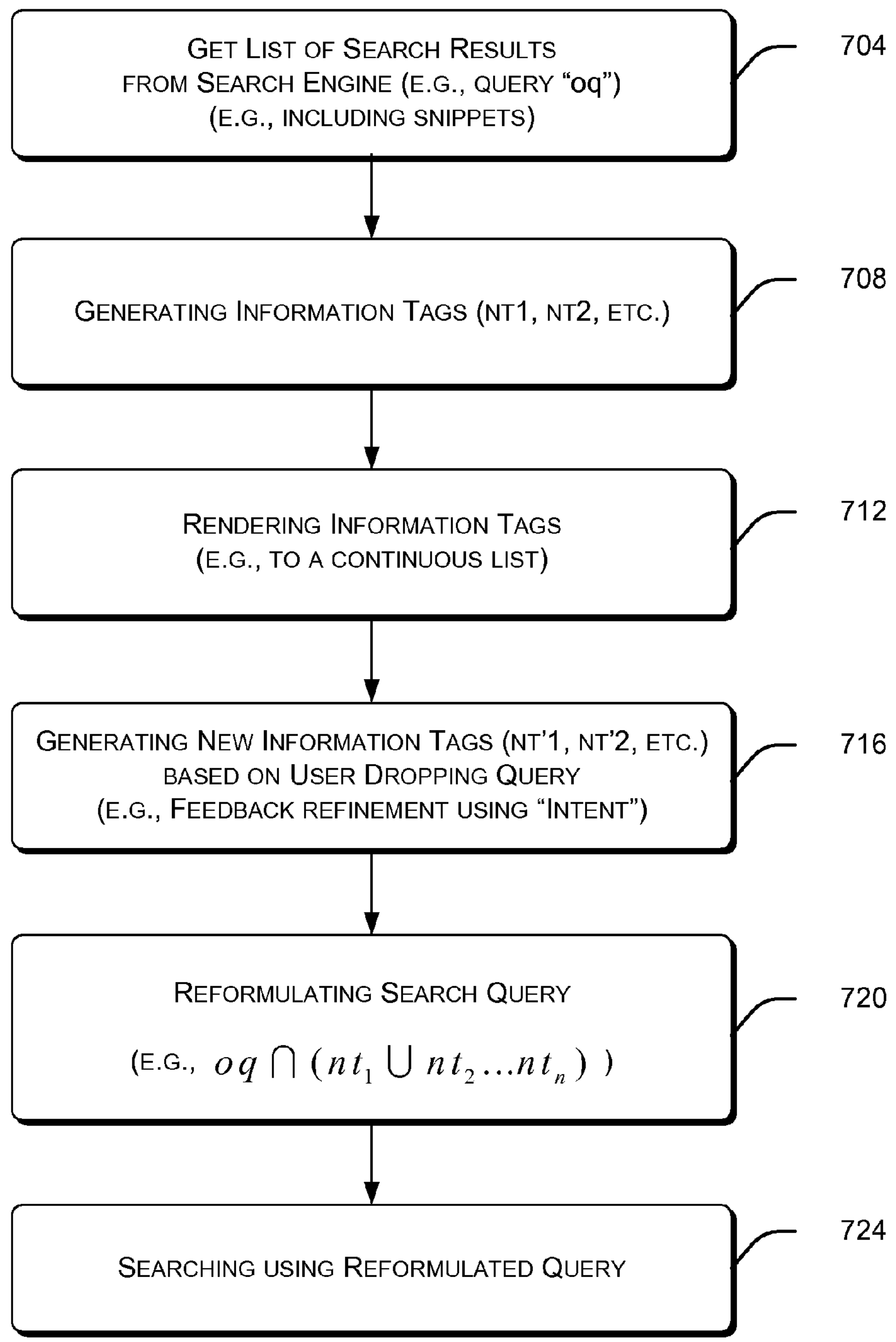
FIG. 7 is a diagram of an exemplary method for reformulating a search query and searching using the reformulated search query.

FIG. 6 shows various components of an exemplary Graph-based Web Search system 600. The system 600 allows a user 604 to take actions such as drag 630 and drop 640, which, in turn, can reformulate a query 650. The system 600 includes a query 608, an action block 610 to get webpages 612 from a search engine, an information tag generation block 620 that generates information tags 622, a function 624 to combine information tags 622 with information from a user drag action 630 where the function can re-rank results 634, a function 642 to combine information for re-ranked results 634 with information from a user drop action 640 and the query reformulation block 650 to reformulate a query based on, for example, results of the function 642. As shown in FIG. 6, the function 642 can also direct information to a function 660 that integrates user feedback. FIG. 7 shows an exemplary method 700 that explains how the GWS system 600 operates.

The exemplary method 700 commences in an initial search results block 704, for example, where a search engine retrieves a list of Web pages in response to a user inputting a term, terms, a phrase, etc. In this example, the initial query is labeled "oq". The method 700 continues in a generation block

708 that generates information tags based on the search results where the information tags are labeled nt1, nt2, etc. A rendering block 712 renders the information tags, for example, in the form of a continuous list suitable for display using a SI control graphic such as the half-moon of FIGS. 1-4.

Once the method 700 displays one or more of the information tags, the user can input further information regarding intent. Such information is then used in a generation block 716 to generate new information tags (nt'1, nt'2, etc.). The new information tags are used in a reformulation block 720 that reformulates a search query. Various techniques can be used to formulate a new search query and the block 720 shows a particular equation or criterion for such a formulation. According to the method 700, once a new search query has been formulated, a search block 724 causes a search engine(s) to perform a search using the reformulated search query. Hence, a user can improve search results in an effort to find desired information.

Thus, as described herein an exemplary method may include the following actions:

(1) Getting a list of search results, including their snippets, from a general search engine;

(2) At the beginning, the information tags are extracted from the search results returned in the first step. After the users finish refinement of their information needs and conduct the dropping operation, both users' preference and the search results will be integrated for generating new information tags.

(3) Rendering information tags to a continuous list. The purpose of this step is to organize the information tags to smoothly change in concepts. When users hover the mouse cursor over the SI control, the search scope will also gradually change accordingly. This is very feasible for users to refine their search intention;

(4) When user drops the query, we assume results previewed on RP control are more relevant to user's search intention than those displayed in the previous preview. These results are used as feedback information for generating new information tags;

(5) When user drops the mouse cursor, the search query will be reformulated and sent to general search engine to get new results. Suppose the original query is oq, the terms contained in the selected information tags are nt1, nt2 . . . ntn, then the new query is constructed according to a formula or criterion or criteria; and (6) The above actions are repeated until the desired information is found.

In an exemplary GWS system, various algorithms can be used to help generate information tags. Such algorithms may extract and rank salient phrases from a group of documents returned by a search engine. Each salient phrase may correspond to a cluster of documents and the phrase may be used as a cluster name.

Figure 8:
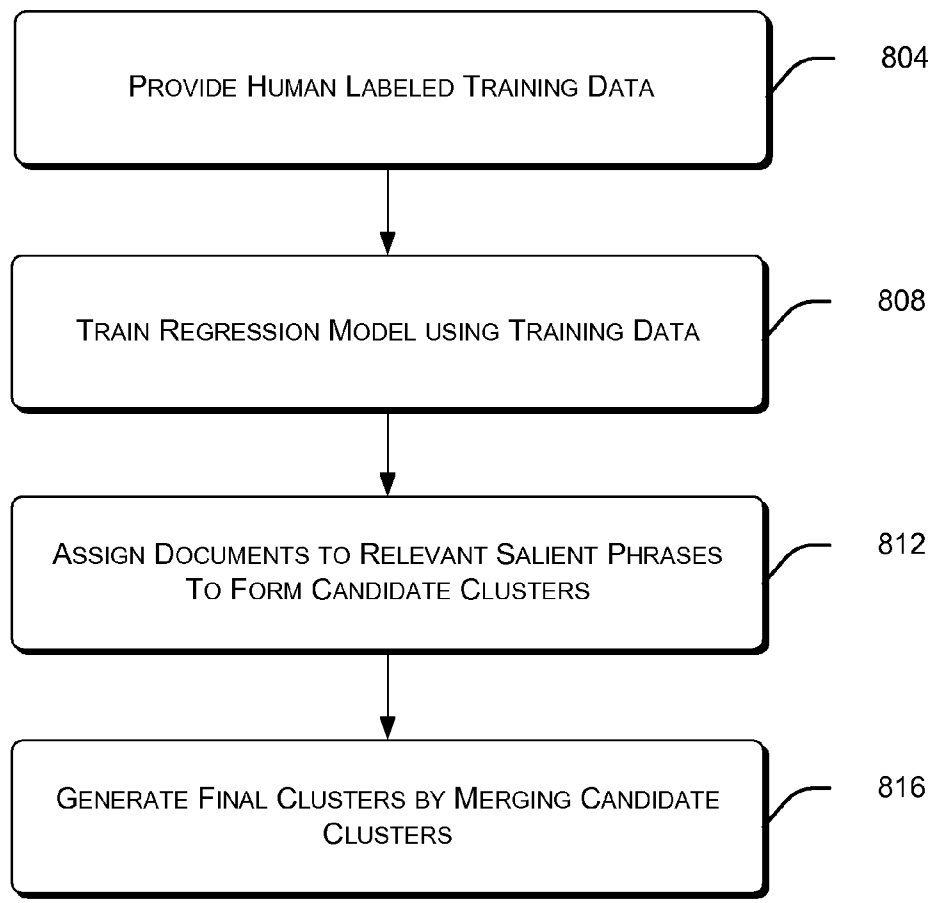
FIG. 8 is a diagram of an exemplary method for training a model and using the model to cluster information (e.g., to cluster documents such as Webpages)

FIG. 8 shows an exemplary method 800 for cluster generation. In a provision block 804, human labeled training data is provided. A training block 808 follows that uses the data for regression model training. An assignment block 812 assigns documents to relevant salient phrases to form candidate clusters. A generation block 816 generates final clusters by merging or otherwise handling the candidate clusters.

The exemplary method 800 can automatically learn a regression model from human labeled training data for extracting salient phrases. As explained, documents can be assigned to relevant salient phrases to form candidate clusters, and the final clusters can be generated by merging these candidate clusters. Each document can belong to more than one cluster.

Figure 9:
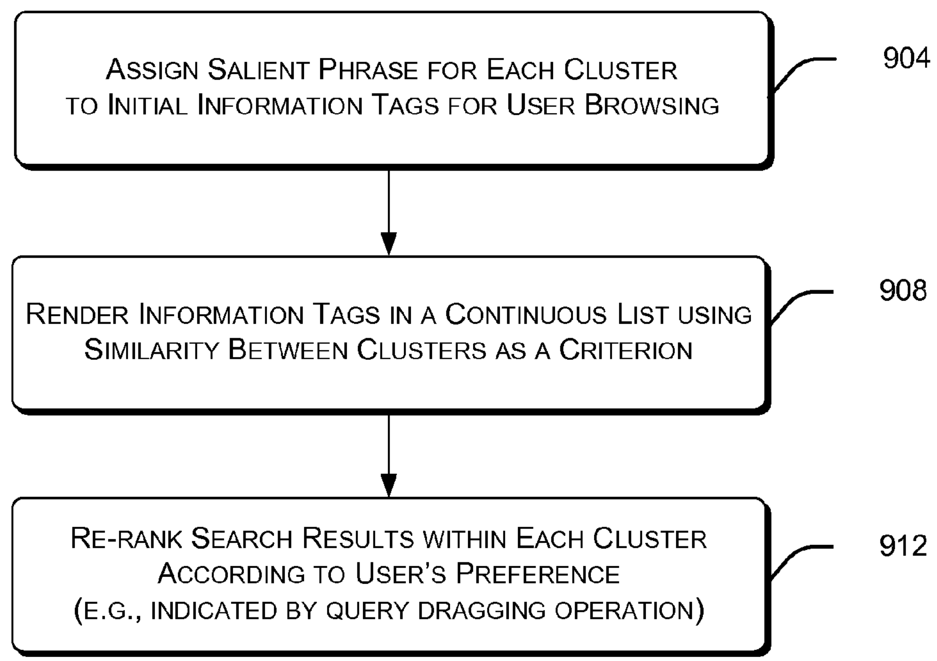
FIG. 9 is a diagram of an exemplary method for static clustering.

FIG. 9 shows an exemplary method of a static cluster algorithm 900. In an assignment block 904, the method 900 assigns a salient phrase for each cluster to initial information tags for user browsing. Thus, a salient phrase for each cluster is used as initial information tags for user browsing. In a rendering block 908, the method 800 renders information tags in a continuous list using similarity between clusters as a criterion. While the term "continuous" is used, it can be appreciated that such a list may be in another form whereby a user input graphic can arrange the terms such that user input can be received to establish a relationship between user intent with respect to a search and the various information tags. A re-rank block 912 re-ranks search results within each cluster according to a user's preference, as indicated by user input, which may occur through a query dragging operation (e.g., manipulating a query graphic in a user input portion of a user interface).

The static method 900 does not consider the user feedback information. In other words, in the method 900, the clusters will not change no matter what user inputs. Hence, FIG. 10 shows a feedback algorithm where user feedback can be used, particularly feedback on user intent.

Figure 10:
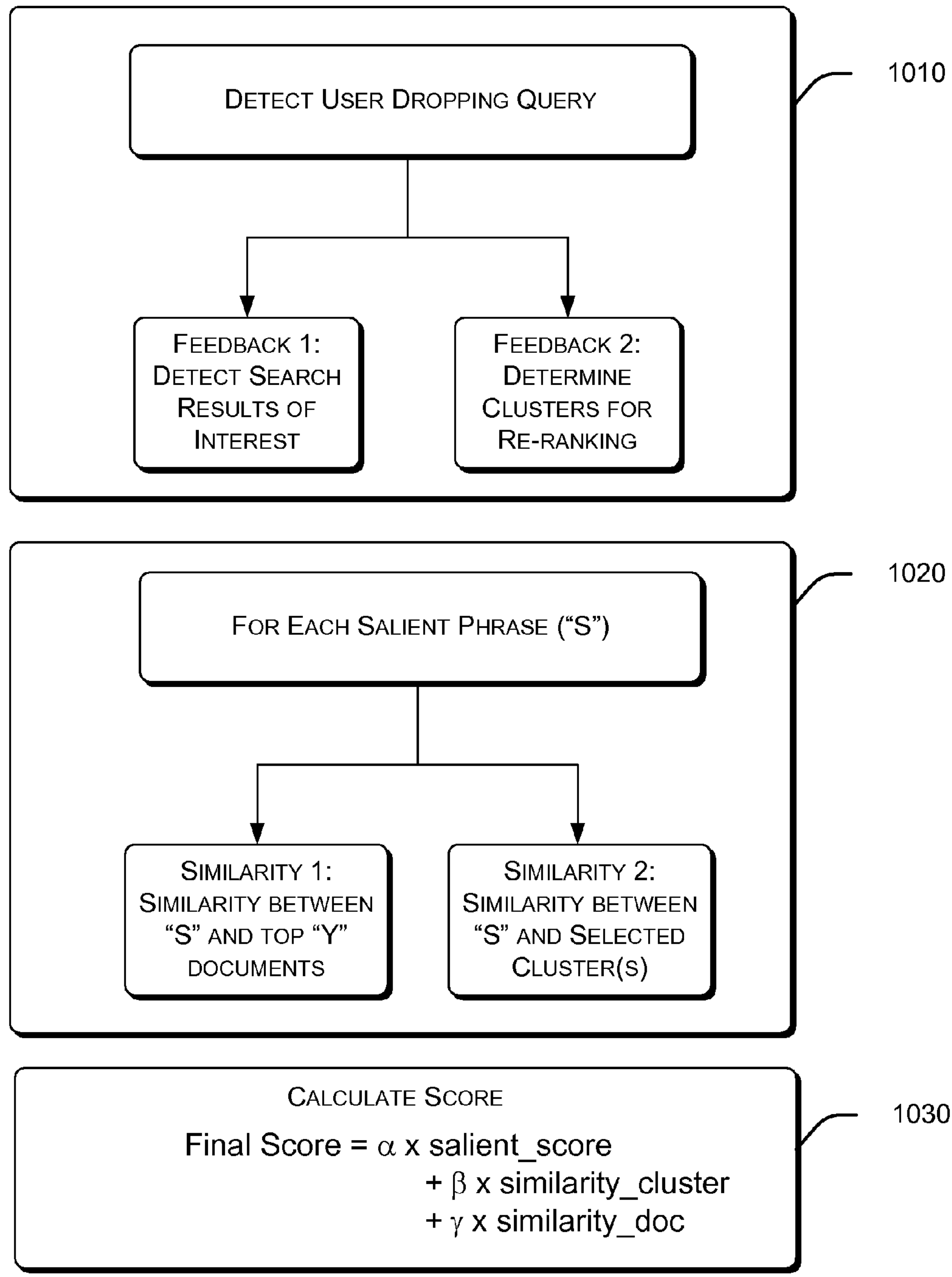
FIG. 10 is a diagram of an exemplary method that includes a feedback algorithm (see, e.g., the GWS system of FIG. 6)

FIG. 10 shows three main operational blocks 1010, 1020 and 1030. The block 1010 pertains to detection of user feedback where dropping a query graphic can (1) detect search results of interest and/or (2) determine clusters for re-ranking. The block 1020 pertains to similarity where, for each salient phrase "s": (1) similarity between "s" and a number of "top" documents (e.g., Web pages) may be determined and/or (2) similarity between "s" and one or more selected clusters may be determined. The block 1030 pertains to a final score that is determined using a salient score value, a similarity cluster value and/or a similarity document value. In a particular example, all three of these values are used to calculate a final score. Further, one or more weights may be used, as illustrated by the equation that appears in block 1030 (see, e.g., weights $\alpha$, $\beta$ and $\gamma$).

Thus, according to the feedback method 1000 of FIG. 10, an algorithm may be used to integrate user feedback information with a user's search intention. Accordingly, as discussed above, results displayed using an RP control can be updated dynamically when a user drags an input query graphic associated with a SI control. For example, once a user drops the query, an exemplary GWS system assumes that the user identified more relevant information. At shown in the block 1010, two kinds of feedback can be obtained: 1) the search results user is interested in and 2) the clusters used for re-rank. In a subsequent run of information tag generation (e.g., next iteration), for each salient phrase "s", the GWS system can determine two similarities: 1) the similarity between "s" and the top "Y" documents and 2) the similarity between "s" and one or more selected clusters. A final score may be calculated per block 1030, for example, where the coefficients take on appropriate values (e.g., $\alpha$=0.3, $\beta$=0.3 and $\gamma$=0.4, as determined through trials).

In the block 1020, similarity can be calculated by using a vector space model. For example, the assumption may be that the salient score for each phrase is no longer determined only by the information in the result set. User feedback can also contribute to the selection of salient phrases, especially where the top "Z" documents (e.g., top 10 documents) are implicitly confirmed by user's drop operation (or other action).

Figure 11:
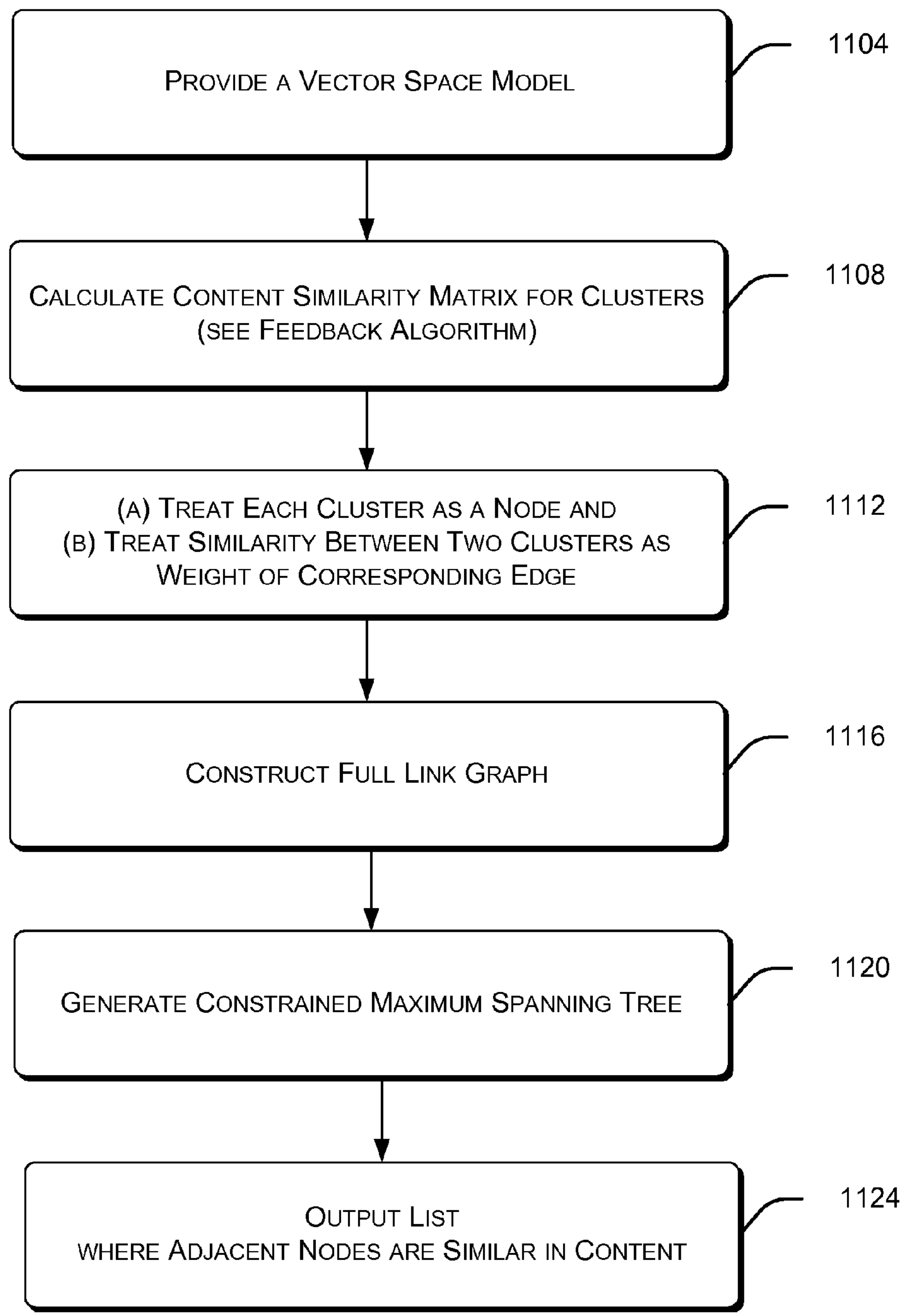
FIG. 11 is a diagram of an exemplary method for outputting a list where adjacent nodes (e.g., clusters) are similar in content.

FIG. 11 shows an exemplary method for list generation 1100. The method 1100 commences in a provision block 1104 that provides a vector space model. A calculation block

1108 calculates a content similarity matrix for clusters. For example, the following equation may be used:

$$M_{i,j} = \frac{\vec{c_i} \cdot \vec{c_j}}{|\vec{c_i}||\vec{c_j}|}$$

where $c_i$ and $c_j$ are vectors of two cluster centroids. The method 1100 then, in action block 1112, treats each cluster as a node and treats similarity between two clusters as a weight of a corresponding edge. A construction block 1116 constructs a full link graph 1116 and a generation block 1120 generates a constrained maximum spanning tree. The method 1100 then outputs a list where adjacent nodes are similar in content.

Figure 12:
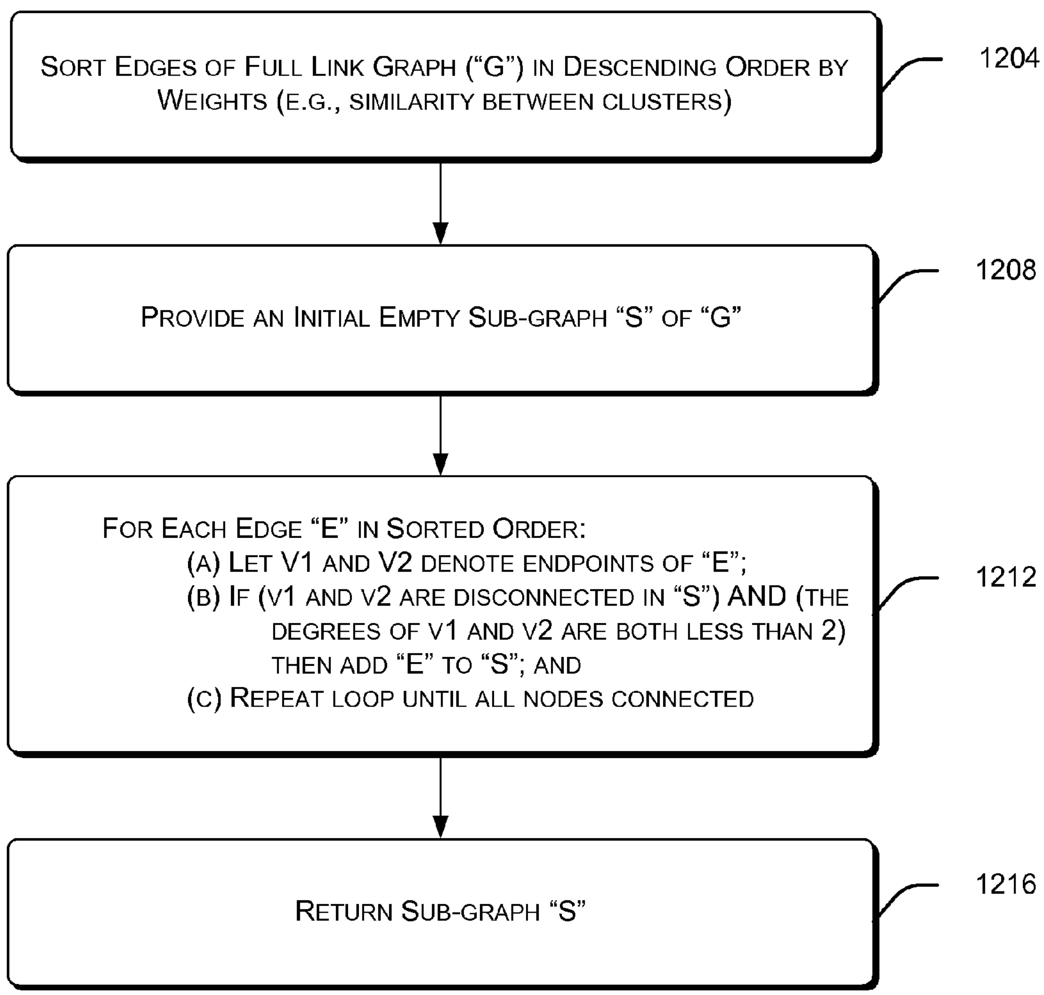
FIG. 12 is a diagram of an exemplary method that includes a maximum spanning tree algorithm.

FIG. 12 shows an exemplary method 1200 for a constrained maximum spanning tree (CMST). The method 1200 commences in a sort block 1204 that sort the edges of a full link graph "G" in descending order by weights (e.g., similarity between clusters). A provision block 1208 provides an initially empty sub-graph "S" of full link graph "G". A connection block 1212 connects nodes as for each edge "E" in sorted order using the following actions: (a) Let v1 and v2 denote the two endpoints of E; (b) If (v1 and v2 are disconnected in S) AND (the degrees of v1 and v2 are both less than 2), add E to S; and (c) Repeat the loop until all nodes are connected. A return block 1216 then returns the sub-graph "S".

An exemplary method uses a minimum spanning tree that differs from a conventional minimum spanning tree in that it is ensured that the degree of each node is no more than 2 in the final graph. Thus, by such a technique a list whose adjacent nodes are similar in contents can be generated.

Figure 13:
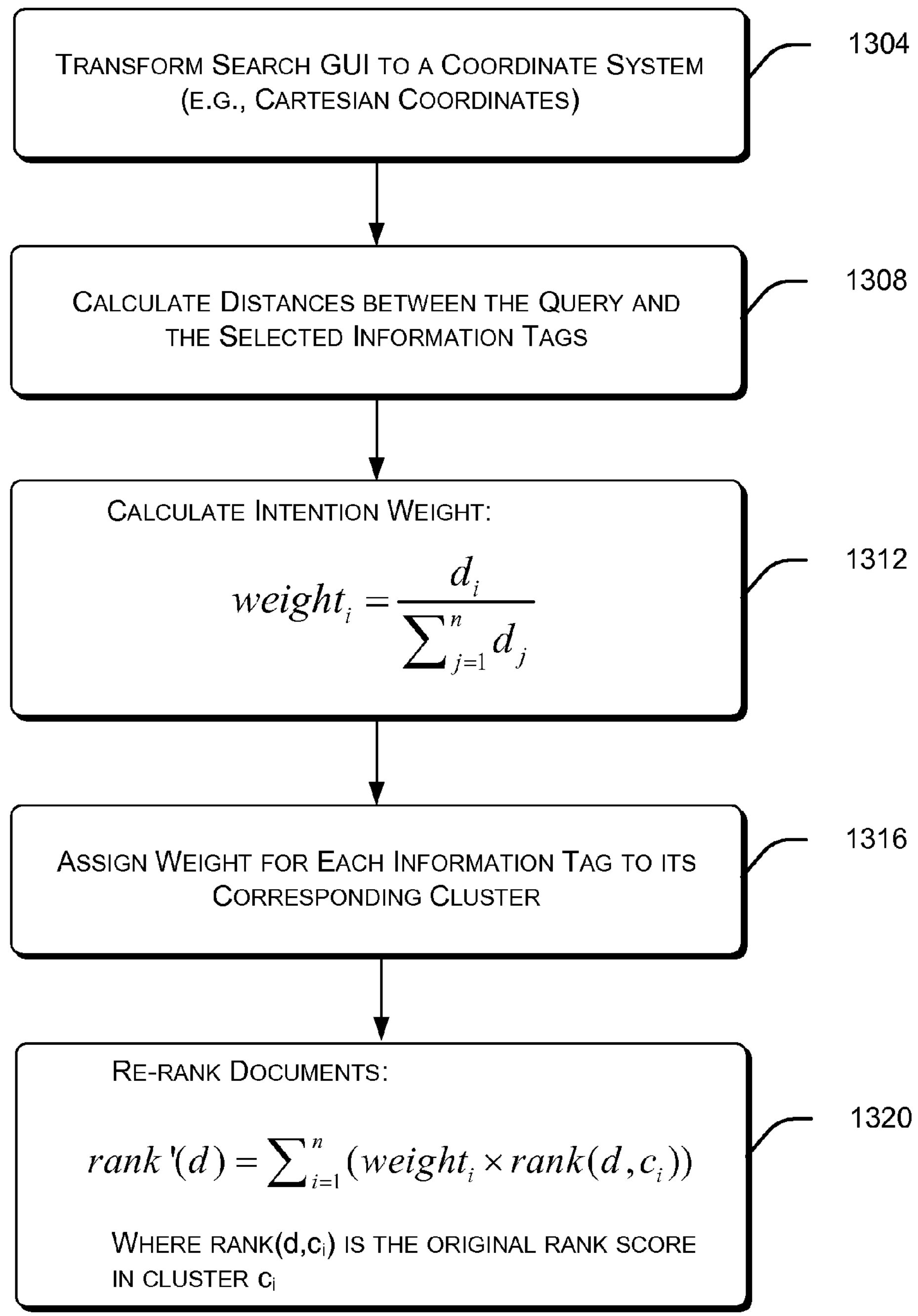
FIG. 13 is a diagram of an exemplary intention weighting method for re-ranking documents (e.g., Webpages)

With respect to intention weighting, an exemplary drag-and-drop operation enables a user to easily refine her search intention. As shown in FIG. 13, an exemplary intention weighting algorithm 1300 can be used to help re-rank current search results. According to the method 1300, a transform block 1304 transforms a search GUI space to a coordinate system, if it is not already defined according to a suitable coordinate space. In the example of FIG. 13, the search GUI may be transformed or mapped to a Cartesian coordinate space.

Once a coordinate system is established, a calculation block 1308 calculates distances between the query (e.g., query graphic) and the selected information tags (e.g., selected by manipulating the query graphic). Another calculation block 1312 calculates intention weights according to a suitable formula (see, e.g., equation of block 1312). An assignment block 1316 then assigns a weight for each information tag to its corresponding cluster. A re-ranking block 1320 then re-ranks the search results (e.g., the documents) using a suitable formula (see, e.g., equation of block 1320), which uses the weights and original rank scores in a cluster. Of note, a document in a search result can belong to more than one cluster.

After re-ranking, a new top "10" list of results may be displayed using a RP control. In such an example, a user's experience is similar to browsing a book: once a user finds some chapters of interest, she can drop the query and drill down to read more. In this way, a user can gradually approach what she expects to find.

As described herein, an exemplary method (e.g., implemented at least in part by a computing device) includes displaying information tags generated from ranked search results responsive to a search query; receiving drag information from a user dragging a graphic relative to the displayed information tags; responsive to the drag information, re-ranking the search results; receiving drop information from a user dropping the graphic; and, in response to the drop information, reformulating the search query.

Figure 14:
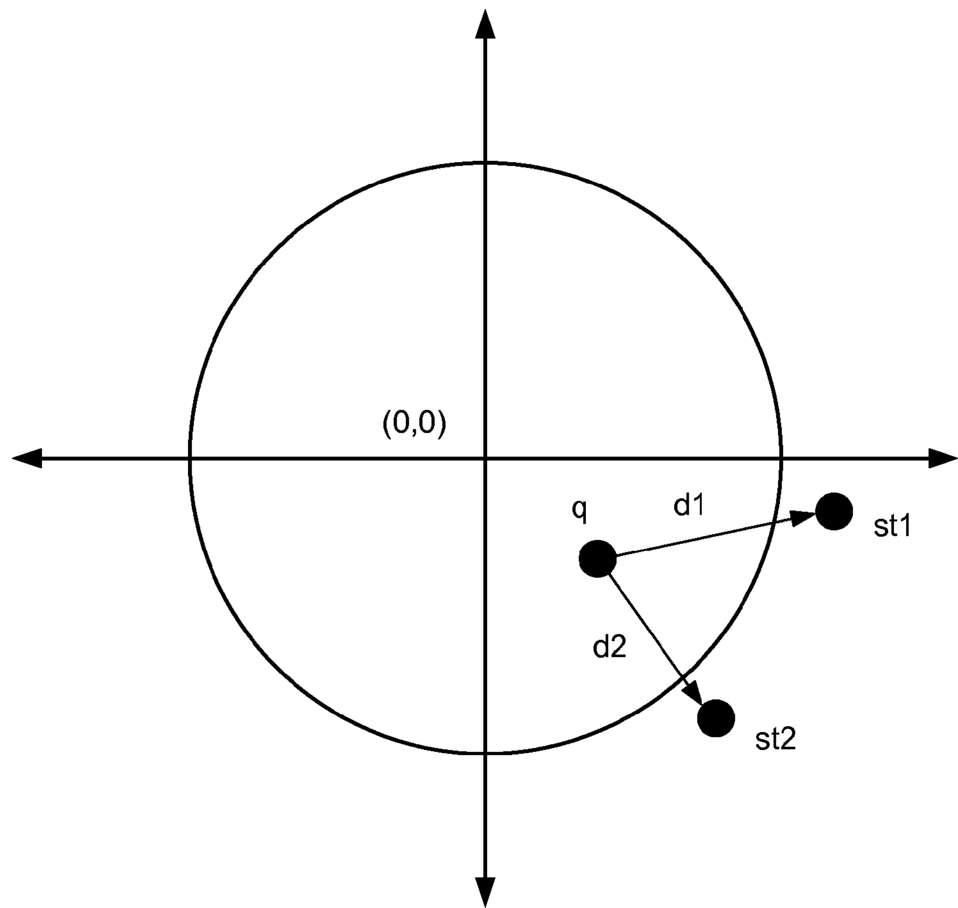
FIG. 14 is a diagram of an exemplary Cartesian coordinate mapping.

FIG. 14 shows an exemplary Cartesian coordinate system and positions that represent a query graphic and information tags 1400. As already mentioned, an exemplary method may transform a half-moon graphic into Cartesian coordinate system and calculate the distances between the query and the selected information tag or tags. Where two information tags, st1 and st2, are selected, their distances from the initial query (e.g., the query graphic) can be denoted by d1 and d2 respectively, as shown in FIG. 14.

Various exemplary user interfaces are presented herein, which include, at least, a half-moon, information tags along a half-moon, two half-circles inside a half-moon and a textbox in the center of an internal half-circle.

Figure 15:
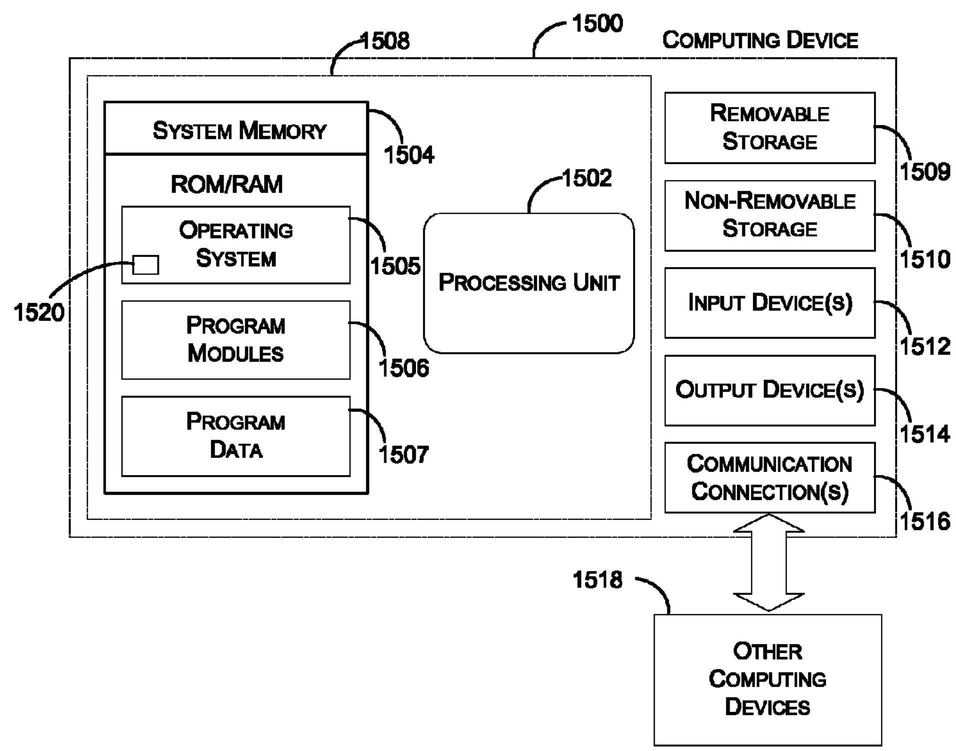
FIG. 15 is a diagram of an exemplary computing environment suitable for implementing various method described herein.

FIG. 15 shows various components of an exemplary computing device 1500 that may be used to implement part or all of various exemplary methods discussed herein.

The computing device shown in FIG. 15 is only one example of a computer environment and is not intended to suggest any limitation as to the scope of use or functionality of the computer and network architectures. Neither should the computer environment be interpreted as having any dependency or requirement relating to any one or combination of components illustrated in the example computer environment. Various exemplary method, mechanisms, etc., may be implemented, in part or in whole, by a computing device or equipment in a computing environment.

With reference to FIG. 15, one exemplary system for implementing an exemplary web search mechanism (e.g., GUI, etc.) includes a computing device, such as computing device 1500. In a very basic configuration, computing device 1500 typically includes at least one processing unit 1502 and system memory 1504. Depending on the exact configuration and type of computing device, system memory 1504 may be volatile (such as RAM), non-volatile (such as ROM, flash memory, etc.) or some combination of the two. System memory 1504 typically includes an operating system 1505, one or more program modules 1506, and may include program data 1507. This basic configuration is illustrated in FIG. 15 by those components within dashed line 1508.

The operating system 1505 may include a component-based framework 1520 that supports components (including properties and events), objects, inheritance, polymorphism, reflection, and provides an object-oriented component-based application programming interface (API), such as that of the .NET™ Framework manufactured by Microsoft Corporation, Redmond, Wash.

Computing device 1500 may have additional features or functionality. For example, computing device 1500 may also include additional data storage devices (removable and/or non-removable) such as, for example, magnetic disks, optical disks, or tape. Such additional storage is illustrated in FIG. 15 by removable storage 1509 and non-removable storage 1510. Computer storage media may include volatile and nonvolatile, removable and non-removable media implemented in any method or technology for storage of information, such as computer readable instructions, data structures, program modules, or other data. System memory 1504, removable storage 1509 and non-removable storage 1510 are all examples of computer storage media. Thus, computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1500. Any such computer storage media may be part of device 1500. Computing device 1500 may also have input device(s) 1512 such as keyboard, mouse, pen, voice input device, touch input device, etc. Output device(s) 1514 such as a display, speakers, printer, etc. may also be included. These devices are well know in the art and need not be discussed at length here.

Computing device 1500 may also contain communication connections 1516 that allow the device to communicate with other computing devices 1518, such as over a network. Communication connection(s) 1516 is one example of communication media. Communication storage media is typically embodied by computer readable instructions, data structures, program modules, etc. Other forms of communication media include wired media such as a wired network or direct-wired connection, and wireless media such as acoustic, RF, infrared and other wireless media.

Various modules and techniques may be described herein in the general context of computer-executable instructions (or processor-executable instructions), such as program modules, executed by one or more computers or other devices. Generally, program modules include routines, programs, objects, components, data structures, etc. for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments.

One skilled in the relevant art may recognize, however, that the techniques described herein may be practiced without one or more of the specific details, or with other methods, resources, materials, etc. In other instances, well known structures, resources, or operations have not been shown or described in detail merely to avoid obscuring aspects of various exemplary techniques.

While various examples and applications have been illustrated and described, it is to be understood that the techniques are not limited to the precise configuration and resources described above. Various modifications, changes, and variations apparent to those skilled in the art may be made in the arrangement, operation, and details of the methods and systems disclosed herein without departing from their practical scope.

The invention claimed is:

1. A method implemented at least in part by a computing device, the method comprising:

receiving, by the computing device, search results responsive to a search query conducted using a search term;

based at least in part on the search results, generating, by the computing device, information tags of phrases for graphical display at respective locations adjacent to a control graphic configured to receive a positioning input from a user, the respective locations of the information tags being organized according to a change in concepts associated with the information tags, and the control graphic comprising a graphic representing the search term, the graphic representing the search term being positionable relative to the respective locations of the information tags to express a user's search intent with respect to the information tags;

receiving, by the computing device, a positioning input via the control graphic that positions the control graphic;

selecting at least two information tags of the information tags based at least in part on a distance between the control graphic and the information tags;

weighting a selected information tag of the at least two selected information tags based at least in part on a distance between a location of the control graphic and the selected information tag;

weighting another selected information tag of the at least two selected information tags based at least in part on a distance between a location of the control graphic and the other selected information tag; and ranking the search results based at least in part on the weighted information tag and the other weighted information tag.

2. The method of claim 1, further comprising displaying the control graphic, the information tags adjacent to the control graphic, and the search results.

3. The method of claim 1, further comprising displaying the ranked search results in response to receiving the positioning input via the control graphic.

4. The method of claim 1, further comprising adjusting one or more display characteristics of one or more of the information tags in response to receiving the positioning input via the control graphic.

5. The method of claim 4, wherein the adjusting comprises adjusting a display color of the one or more of the information tags.

6. One or more computer-readable memory storing computer-readable instructions that, when executed by one or more processors, cause the one or more processors to:

receive search results responsive to a search query conducted using a search term;

generate information tags for graphical display at locations adjacent to a control graphic configured to receive a user input, the locations of the information tags being organized according to a change in concepts associated with the information tags, and the control graphic comprising a query graphic representing the search term, the query graphic being positionable relative to the respective locations of the information tags to express a user's search intent with respect to the information tags;

receive a user input via the control graphic, the received user input comprising the user positioning the query graphic at a location relative to the respective locations of the information tags;

select at least two information tags of the information tags based at least in part on a distance between the location of the query graphic and the information tags;

weight a selected information tag of the at least two selected information tags based at least in part on a distance between the location of the query graphic and the selected information tag;

weight another selected information tag of the at least two selected information tags based at least in part on a distance between the location of the query graphic and the other selected information tag; and rank the received search results based at least in part on the weighed information tag and the other weighted information tag.

7. The one or more computer-readable memory of claim 6, further comprising computer-readable instructions that, when executed by the one or more processors, cause the one or more processors to display the control graphic, the information tags adjacent to the control graphic, and the received search results.

8. The one or more computer-readable memory of claim 6, further comprising computer-readable instructions that, when executed by the one or more processors, cause the one or more processors to display the ranked search results in response to the received user input via the control graphic.

9. The one or more computer-readable memory of claim 6, further comprising computer-readable instructions that, when executed by the one or more processors, cause the one or more processors to adjust one or more display characteristics of one or more of the information tags in response to the received user input via the control graphic.

10. The one or more computer-readable memory of claim 9, wherein the adjusting comprises adjusting a display color of the one or more of the information tags.

11. A computing device comprising:

one or more processors;

memory storing computer-executable instructions, that when executed by the one or more processors, perform acts comprising:

receiving search results responsive to a search query conducted using a search term;

generating information tags for graphical display at locations adjacent to a control graphic configured to receive a positioning input from a user, the control graphic comprising:

a query graphic representing the search term, the query graphic being positionable relative to the locations of the information tags to express a user's search intent with respect to the information tags;

receiving a positioning input via the control graphic, the received positioning input comprising the user positioning the query graphic at a location relative to the locations of the information tags;

selecting one or more of the information tags based at least in part on a proximity of the query graphic to the information tags;

weighting a selected information tag of the one or more selected information tags based at least in part on a distance between the location of the query graphic and the selected information tag; and ranking the search results based at least in part on the weighted information tag.

12. The computing device of claim 11, wherein the locations of the information tags are organized according to a change in concepts associated with the information tags.

13. The computing device of claim 11, wherein the acts further comprise:

displaying the control graphic, the information tags adjacent to the control graphic, and the received search results.

14. The computing device of claim 11, wherein the acts further comprise:

based at least in part on the received positioning input, displaying the ranked search results.

15. The computing device of claim 11, wherein the acts further comprise:

based at least in part on the received positioning input, adjusting one or more display characteristics of one or more of the information tags.

16. The computing device of claim 11, wherein positioning the query graphic comprises dragging the query graphic relative to the locations of the information tags.

* * * * *